(12) United States Patent
Song et al.

(10) Patent No.: US 11,071,957 B2
(45) Date of Patent: Jul. 27, 2021

(54) NOZZLE FOR A DOWN-FLOW HYDROPROCESSING REACTOR

(71) Applicant: Chevron U.S.A. Inc., San Ramon, CA (US)

(72) Inventors: Steven Xuqi Song, Fairfield, CA (US); Timothy D. Breig, Oakland, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/399,143

(22) Filed: Apr. 30, 2019

(65) Prior Publication Data

US 2019/0329203 A1    Oct. 31, 2019

Related U.S. Application Data

(60) Provisional application No. 62/664,935, filed on Apr. 30, 2018, provisional application No. 62/664,602, filed on Apr. 30, 2018.

(51) Int. Cl.

| *B01J 4/00* | (2006.01) |
|---|---|
| *B01J 8/00* | (2006.01) |
| *B01J 8/02* | (2006.01) |
| *B01J 19/00* | (2006.01) |
| *B01J 19/26* | (2006.01) |
| *C10G 49/00* | (2006.01) |

(52) U.S. Cl.
CPC ............ *B01J 4/002* (2013.01); *B01J 8/0278* (2013.01); *B01J 19/26* (2013.01); *C10G 49/002* (2013.01)

(58) Field of Classification Search
CPC . B01J 4/00–002; B01J 8/00; B01J 8/02; B01J 8/0278; B01J 19/00; B01J 19/26; C10G 49/00; C10G 49/002
See application file for complete search history.

(56) References Cited

U.S. PATENT DOCUMENTS 4,597,854 A    7/1986 Penick

FOREIGN PATENT DOCUMENTS

| WO | 2012011989 A1 | 1/2012 |
| WO | 2012011990 A1 | 1/2012 |

*Primary Examiner* — Natasha E Young
(74) *Attorney, Agent, or Firm* — Mark Warzel

(57) ABSTRACT

An improved nozzle device for a down-flow hydroprocessing reactor is disclosed. The down-flow nozzle is useful in the petroleum and chemical processing industries in catalytic reactions of hydrocarbon feedstocks in the presence of hydrogen, at an elevated temperature and pressure, to provide for the mixing and distribution of gas and liquid to reactor catalyst beds. Typical hydroprocessing applications include hydrotreating, hydrofinishing, hydrocracking and hydrodewaxing.

27 Claims, 3 Drawing Sheets view 1C (C-C)

view 1A (A-A)  view 1B (B-B)

view 2A view 2C (A-A)

view 2B (detail B)

view 3.2a view 3.1b view 3.3a view 3.1a view 3.2b view 3.1c view 3.3b

NOZZLE FOR A DOWN-FLOW HYDROPROCESSING REACTOR

CROSS-REFERENCE TO RELATED APPLICATIONS

This application is related to, and claims priority benefit from, U.S. Provisional Application Ser. No. 62/664,602, filed Apr. 30, 2018, and related to, and claims priority benefit from, U.S. Provisional Application Ser. No. 62/664,935, filed Apr. 30, 2018, each of which is herein incorporated by reference in its entirety.

FIELD OF THE INVENTION

An improved nozzle device for a down-flow hydroprocessing reactor is disclosed. The down-flow nozzles are used in the petroleum and chemical processing industries in catalytic reactions of hydrocarbonaceous feedstocks in the presence of hydrogen, at an elevated temperature and pressure, to provide for the mixing and distribution of gas and liquid to reactor catalyst beds. Suitable hydroprocessing applications include hydrotreating, hydrofinishing, hydrocracking and hydrodewaxing.

BACKGROUND OF THE INVENTION

In fixed-bed hydroprocessing reactors, gas and liquid reactants (e.g. hydrogen and a hydrocarbonaceous feedstock) flow downward through one or more beds of solid catalyst. (See, e.g. U.S. Pat. No. 4,597,854 to Penick). As the reactants flow downward through the reactor catalyst beds, the reactants contact the catalyst materials and react to produce the desired products. Gas reactants such as hydrogen are consumed, and heat is generated by the catalytic reactions. Controlling the temperature of the feedstock as it travels downward through the reactor is important to ensure the quality and quantity of product yield is maximized toward the target product(s).

Cool hydrogen-rich gas can be introduced between the catalyst beds to quench the temperature rise and replenish the hydrogen consumed by the reactions. In order to maintain overall reactor performance, the temperature of the fluids within the reactor should be as uniform as possible and liquids and gases should be well mixed in order to maximize performance. Poor interbed fluid mixing can limit reactor operation in various ways. When interbed mixing is unable to erase the radial temperature differences, these differences persist or grow as the process fluids move down the reactor. Hot spots in any bed can lead to rapid deactivation of the catalyst in that region which shortens the total reactor cycle length. Product selectivities are typically poorer at high temperatures. For example, hot regions can cause color, viscosity and other product qualities to be off-specification. Also, if the temperature at any point exceeds a certain value (typically 800 to 850° F.), the exothermic reactions may become self-accelerating leading to a runaway event, which can damage the catalyst, the vessel, or downstream equipment.

Due to these hazards, refiners operating with poor reactor internal hardware must sacrifice yield and/or throughput to avoid the deleterious effects of poor interbed fluid mixing. Reactor temperature maldistribution and hot spots can be minimized through mixing and equilibration of reactants between catalyst beds, correcting any temperature and flow maldistributions, and minimizing pressure drops. The mixing of fluids between catalyst beds can be accomplished through the use of distributer assemblies, including nozzles incorporated on distributor trays. With present-day refinery economics dictating that hydroprocessing units operate at feed rates far exceeding design, optimum interbed fluid mixing is a valuable low-cost debottleneck.

Distributor assemblies, including distributor trays with nozzles, can be used to collect, mix, and distribute fluids in the interbed region of multi-bed catalyst reactors. Various types of nozzle and mixing devices are described in a number of patents and publications. The present invention provides certain improvements over prior art nozzle devices, such as those described in WO 2012/011989 A1 and WO 2012/011990 A1.

Due to the need for sufficient interbed fluid mixing and distribution to provide for good catalyst lifetimes, high throughput, long cycle length, and overall reactor performance, improved mixing and distribution devices are needed. A continuing need therefore exists for nozzle devices in down-flow reactors.

SUMMARY OF THE INVENTION

The present invention is directed to a nozzle device for a down-flow hydroprocessing reactor. The nozzle provides effective mixing and distribution of gas and liquid to a catalyst bed in a hydroprocessing reactor. The nozzle provides effective mixing of an existing mixing volume in mixing the gas and liquid phases of two-phase systems, while providing for a reduced pressure drop through the nozzle as compared with other nozzles. The nozzle is well-suited for retrofit applications and can be used for new reactor designs to achieve efficient fluid mixing and distribution to a reactor catalyst bed. In conjunction with additional mixing and distribution components of a multi-bed down-flow reactor, including, e.g., mixing boxes and distribution trays, the nozzle provides effective mixing and distribution of the liquid and gas phases in a reactor.

The nozzle generally includes a nozzle body having a top, bottom, length, width or diameter, and a wall having an interior and exterior surface. The nozzle is characterized by having at least three zones: a gas inlet zone body portion, a liquid inlet zone body portion, and an exit zone body portion. The gas and liquid inlet zones have respective volumes for the introduction of gas and liquid into the nozzle through the inlets. The nozzle also includes a cap or other closure at the top of the nozzle body and a nozzle flow restrictor located at the bottom of the nozzle. The nozzle restrictor is generally referred to as a converging-diverging nozzle restrictor since it includes a converging zone and a diverging zone, each zone having a frustoconical shape.

The invention also relates to hydroprocessing system comprising the nozzle and the use of the nozzle in a hydroprocessing system, including, e.g., in a distributor tray apparatus for the interbed distribution of gas and liquid to a catalyst bed.

The invention further relates to a method for making a nozzle for the distribution of a gas-liquid fluid mixture in a down-flow reactor. For example, in an embodiment of the invention, the nozzle body may be formed from a standard size pipe of a pre-determined length and width or diameter to form a nozzle body having a top, bottom, length, width or diameter, and a wall having an interior and exterior surface. The method includes forming a gas inlet zone body portion in the nozzle body comprising forming at least two offset gas inlets through the wall of the gas inlet zone body portion and forming a liquid inlet zone body portion in the nozzle body comprising forming at least one liquid inlet through the wall of the liquid inlet zone body portion. An exit zone body portion is formed in the nozzle comprising adapting or configuring the bottom of the nozzle body to include a nozzle restrictor. A nozzle restrictor comprising a frustoconical converging zone and a frustoconical diverging zone is formed as an integral part of the bottom of the nozzle body or from a separate material. When formed from a separate material, the nozzle restrictor is inserted or attached to the bottom of the nozzle body. A nozzle cap configured to enclose the top of the gas inlet zone body portion may also be formed as an integral part of the top of the nozzle body or from a separate material. When formed from a separate material, the nozzle cap is affixed to the top of the nozzle body to enclose the top of the gas inlet zone body portion.

BRIEF DESCRIPTION OF THE DRAWINGS

FIG. 1 shows a schematic view of an embodiment of the nozzle device of the invention, including side view 1 and cross-sectional views 1A, 1B, and 1C.

FIG. 2 shows views of an embodiment of the nozzle device showing cross-sectional view 2A, detail B in view 2B, and bottom view 2C.

FIG. 3 shows a side, top and bottom perspective view of an embodiment of the nozzle device of the invention, including isometric views oriented from the side (view 3.1a), bottom (views 3.1c, 3.2b, and 3.3b, and top (views 3.1b, 3.2a, and 3.3a) of the nozzle.

DETAILED DESCRIPTION

Figure 1:
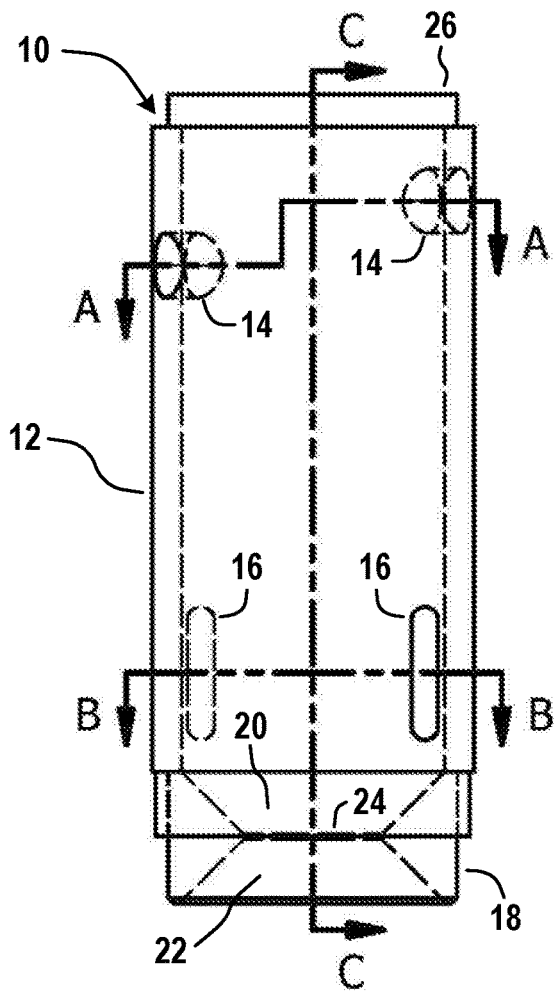
FIGS. 1-3 provide representative views of a nozzle device according to an embodiment of the invention. The scope of the invention is not limited by these representative figures and is to be understood to be defined by the claims of the application.
Figure 1:
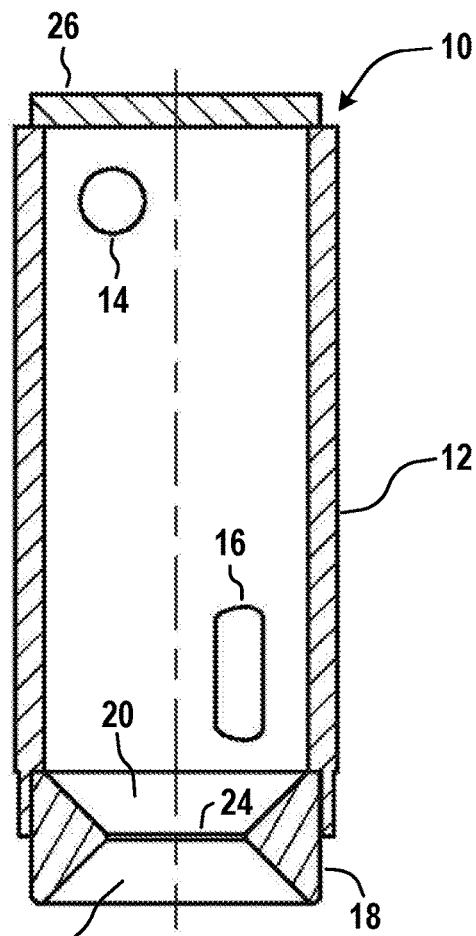
Figure 1:
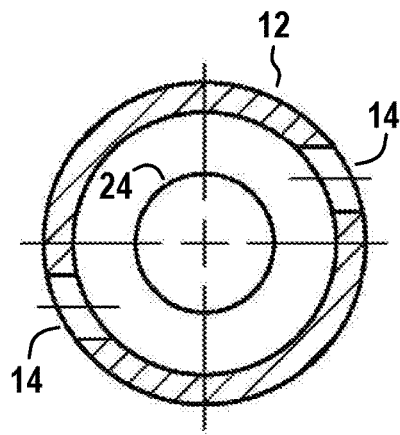
Figure 1:
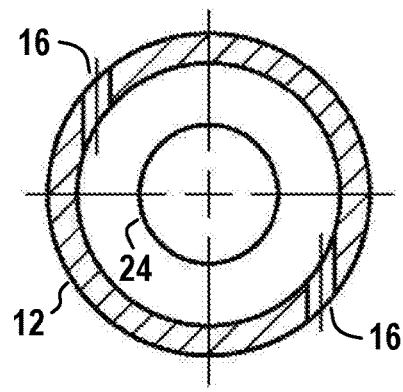

The nozzle device of the present invention provides benefits over nozzle devices known in the art. Such benefits include, reduced cost and simplicity of fabrication, as well as operational benefits, such as improved stability of operation, improved liquid throughput and higher tolerance for non-standard operating conditions (e.g., high liquid flow-rates and out-of-level conditions).

Specific embodiments and benefits are apparent from the detailed description provided herein. It should be understood, however, that the detailed description, figures, and any specific examples, while indicating beneficial embodiments, including some that are preferred, are intended for purposes of illustration only and are not intended to limit the scope of the invention.

The invention is directed to a nozzle device for a down-flow hydroprocessing reactor. The nozzle comprises a nozzle body having a top, a bottom, a length, a width or a diameter, and a wall having an interior and exterior surface. The nozzle includes a gas inlet zone body portion, a liquid inlet zone body portion, and an exit zone body portion. The gas inlet zone body portion defines a gas inlet zone volume and has at least two offset gas inlets for the passage of gas therethrough into the gas inlet zone volume. The liquid inlet zone body portion defines a liquid inlet zone volume and has at least one liquid inlet for the passage of liquid therethrough into the liquid inlet zone volume. The gas and liquid inlet zone volumes are in fluid communication. Although not required for all applications, the two inlet zones are typically adjacent with the gas inlet zone located on top of the liquid inlet zone. A nozzle cap is located at the top of the nozzle body enclosing the top of the gas inlet zone body portion and a converging-diverging nozzle restrictor is located in the exit zone body portion at the bottom of the nozzle body. The nozzle cap encloses the top of the nozzle body and/or the top of the gas inlet body portion. The nozzle restrictor has a frustoconical converging zone and a frustoconical diverging zone, which meet at a nozzle restriction opening. The frustoconical zones are in fluid communication with each other. Typically, the nozzle body is formed with the gas inlet body portion at the top of the nozzle body, with the liquid inlet zone portion adjacent and below the gas inlet zone and the exit zone body portion adjacent and below the liquid inlet zone body portion.

The nozzle body, including the gas inlet zone, the liquid inlet zone, and the exit zone body portions may generally have any cross-sectional shape. As a matter of convenience, cost, and operational performance, any or all such body portions are typically substantially cylindrical. Typically, the nozzle body is formed from a blank cylinder or pipe, although other cross-sectional shapes may be used.

The nozzle gas inlets are located at differing lengths along the length of the nozzle body from the top of the nozzle body. The gas inlet shape may be slotted, circular or another shape, and is conveniently circular. The gas inlets are offset in their distance from the top (or the bottom) of the nozzle body such that at least one gas inlet is located nearer to the top (or the bottom) of the nozzle body than one or more other gas inlets. While not limited thereto, preferably at least one gas inlet is at least 50% closer to the top of the nozzle body, or at least 30%, or at least 20%, closer than one or more of the other gas inlets. The gas inlets are spaced around the gas inlet zone body portion. The inlet spacing may be varied around the wall of gas inlet zone body portion and are conveniently equally spaced such that the angle between each inlet measured from the center of the nozzle body is about the same. For example, in the case of 2 gas inlets, each inlet may be spaced 180 degrees apart. Similarly, three gas inlets may be equally spaced at about 120 degrees apart, or four gas inlets may be equally spaced at about 90 degrees apart.

The gas inlets are configured to provide mixing of gas and liquid with one or more gas inlets preferably configured to produce a tangential flow of inlet gas around the interior of the gas inlet zone and to thereby provide a gas phase spiral flow. Preferably, two gas inlets are present in the gas inlet zone body portion.

The nozzle liquid inlets are located in the liquid inlet zone body portion, typically below the gas inlet zone body portion of the nozzle. The liquid inlet shape may be slotted, circular or another shape, and is conveniently slotted with circular ends. The liquid inlets may be set at the same location along the length of the nozzle body as measured from the top (or the bottom), or the location of the liquid inlets may be varied along the length. Preferably, the liquid inlets are located at the same height along the nozzle body. The liquid inlets are spaced around the gas inlet zone body portion. The inlet spacing may be varied around the wall of liquid inlet zone body portion and are conveniently equally spaced such that the angle between each inlet measured from the center of the nozzle body is about the same. For example, in the case of 2 liquid inlets, each inlet may be spaced 180 degrees apart. Similarly, three liquid inlets may be equally spaced at about 120 degrees apart, or four liquid inlets may be equally spaced at about 90 degrees apart.

The liquid inlets are configured to produce a tangential flow of liquid around the interior of the liquid inlet zone and to thereby provide a liquid phase spiral flow. At least one liquid inlet is present in the liquid inlet zone body portion; conveniently two liquid inlets are present.

Preferably, the liquid and gas inlets are configured to provide a spiral flow of gas from the gas inlet zone to the liquid inlet zone such that mixing occurs. The liquid inlets may also provide for spiral flow of liquid in the liquid inlet zone such that the gas phase spiral flow and the liquid phase spiral flow are in the same rotational direction. The flow of gas and liquid then passes to the exit zone of the nozzle.

The invention further relates to the use of the nozzles according to the invention in a hydroprocessing system, especially in a down-flow hydroprocessing reactor, e.g., as part of a distribution tray in such reactors.

In one embodiment of the invention, FIG. 1 shows a cross-sectional view of the nozzle 10. The nozzle includes a substantially cylindrical nozzle body 12 having gas inlets 14 and liquid inlets 16, which are, respectively, located in gas inlet and liquid inlet body portions, each defining gas and liquid zone volumes. The nozzle also includes an exit zone body portion at the bottom of the nozzle that includes a nozzle restrictor 18 having a converging zone 20 and a diverging zone 22. A nozzle restriction opening 24 is located between the converging and diverging zones and is substantially circular in shape. The nozzle includes a nozzle cap 26 located at the top of the nozzle body and the top of the gas inlet zone body portion. The nozzle cap is affixed to the top of the nozzle body and may be conveniently welded or otherwise bonded or attached to the top. Views 1A, 1B, and 1C shows cross-sectional views along sectional lines A-A, B-B, and C-C, respectively.

Figure 2:
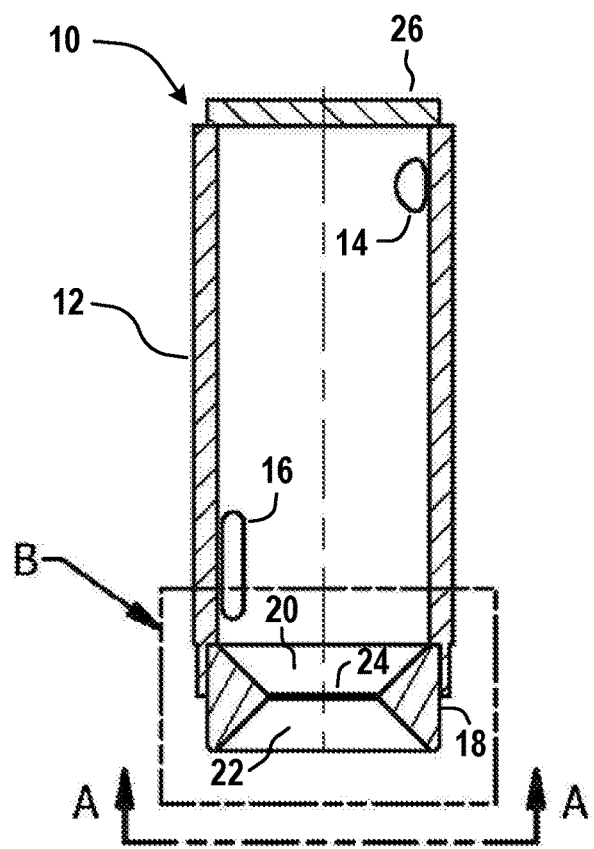
Figure 2:
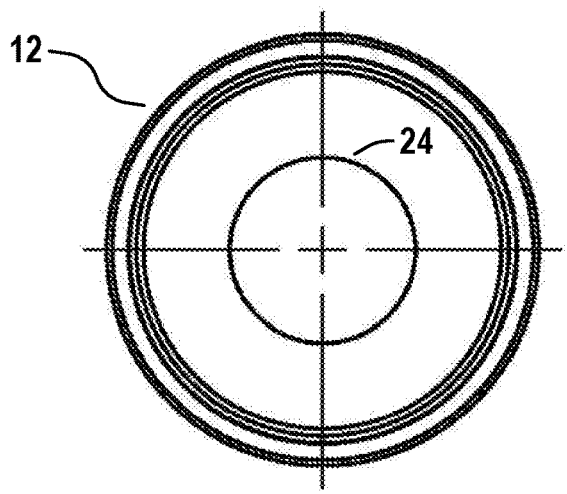
Figure 2:
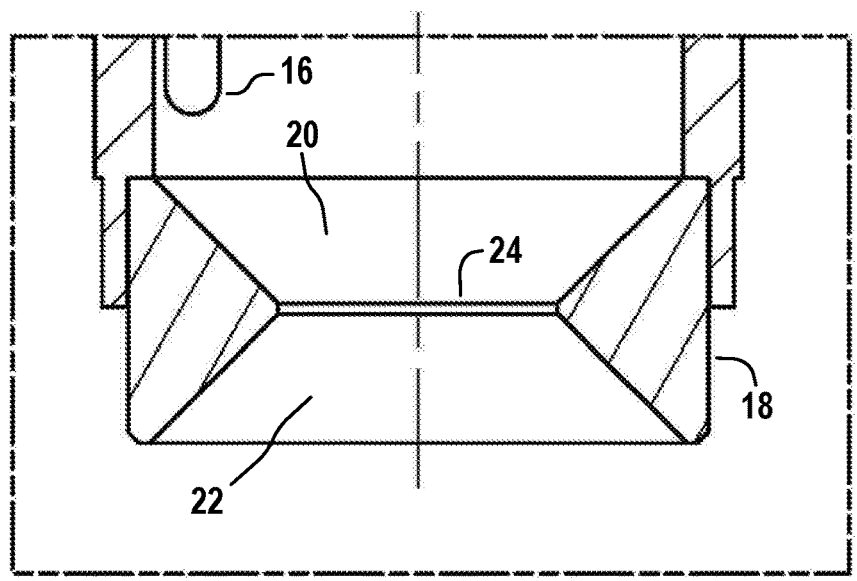

FIG. 2 shows additional views of the same embodiment of the invention, including bottom view 2C along view line A-A. View 2B provides a closer view of Detail B of the nozzle restrictor.

Figure 3:
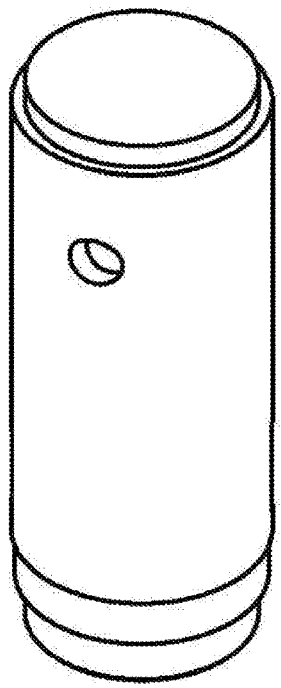
Figure 3:
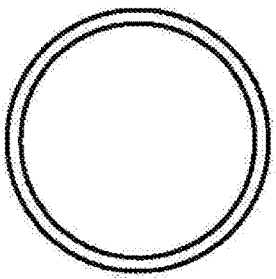
Figure 3:
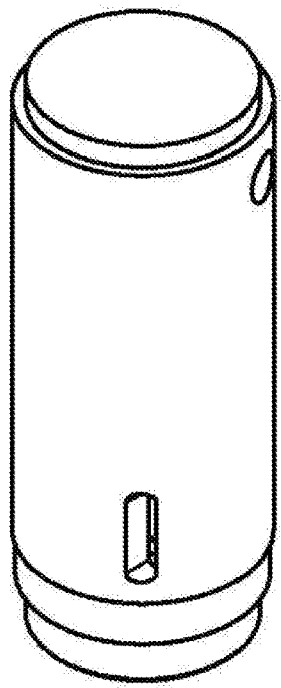
Figure 3:
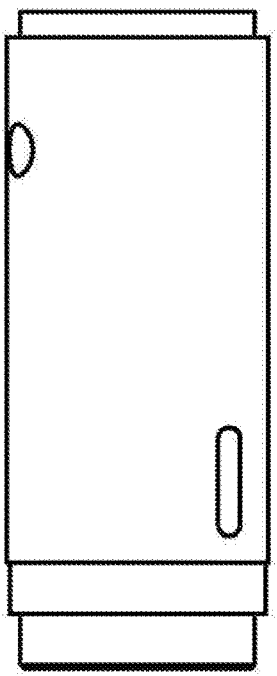
Figure 3:
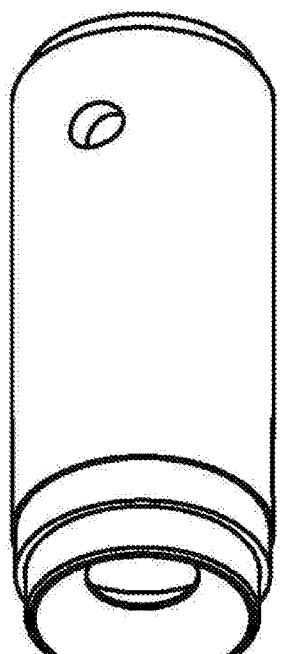
Figure 3:
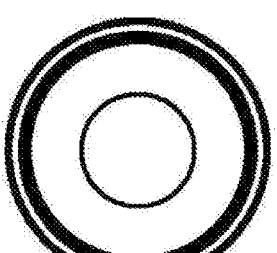
Figure 3:
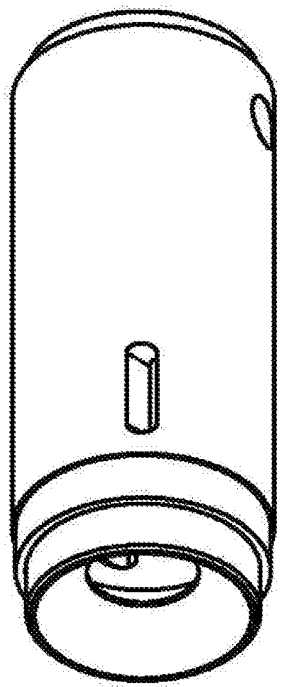

FIG. 3 shows additional perspective views of a nozzle according to the same embodiment of the invention, with views 3.1a, 3.1b, and 3.1c being side, top, and bottom views. Views 3.2a and 3.3a show a top view perspective and views 3.2b and 3.3b show a bottom view perspective of the nozzle.

The nozzle of the invention may generally be constructed by forming some or all the portions of the nozzle body separately or as one body piece. In one embodiment, the nozzle body is formed from a standard pipe sized for the liquid and gas flow rates needed for a particular reactor. While various cross-sectional shapes may be used, cylindrical pipe sections are convenient and preferred for ease of manufacture and cost. The method according to this embodiment includes sizing a section of the pipe to form the nozzle body, such that the nozzle has a defined top, bottom, and diameter (or width in the case of non-circular cross-sections). The nozzle body also generally has a wall defining the interior and exterior of the nozzle body along with interior and exterior surfaces of the body. Gas and liquid inlets are formed in the nozzle body, typically by mechanical means such as drilling or milling a cylindrical portion of the nozzle body. Other means of forming the inlets may also be used, e.g., by 3-D fabrication, molding, or other techniques. The gas inlet and liquid inlet portions of the nozzle body are typically adjacent, with the gas inlets located nearer to the top of the nozzle body and the liquid inlets located nearer to the bottom of the nozzle body and adjacent to the exit zone body portion. The gas inlets are offset along the length of the nozzle body from the top of the nozzle body. The number and locations of the gas inlets can be varied to account for liquid heights on a distribution tray so that at least some of the gas inlets remain open under high liquid load conditions. The exit zone is formed to include a nozzle restrictor, which is typically made from a separate material but may also be formed as an integral portion of the nozzle body, such as when formed from a solid section of the nozzle body. The nozzle restrictor is formed to include a converging zone and a diverging zone, typically through mechanical means such as milling of a solid blank. Alternate techniques are also suitable, e.g., molding or 3-D fabrication, and the like. When formed from a separate material, the nozzle restrictor may be affixed, attached, or connected to the nozzle body using suitable techniques such as welding, adhesive bonding, or by other mechanical means. The nozzle cap is also typically formed from a blank material and may be conveniently shaped according to the nozzle body, such as a circular disk, to fit on the top of the nozzle body. The nozzle cap is also typically affixed, attached, or connected to the top of the nozzle body using suitable techniques, as described herein.

The nozzle of the invention provides certain benefits and improvements in hydroprocessing applications, including: advantageous mixing of gas and liquid inside the nozzle due to swirling of both gas and liquid providing extensive mixing between gas and liquid in the nozzle and while flowing through the nozzle exit zone; formation of a cone-shaped spray pattern at lower fluid flow velocity through the nozzle exit zone (e.g., the nozzle restriction opening 24 in FIG. 1) as compared with other prior art nozzles (e.g., as described in WO 2012/01189 A1 and WO 2012/01190 A1); and, improved operational flexibility and capability at high liquid flowrate due, in part, to the offset location of gas inlet openings located in the gas inlet zone body portion.

The method of making the nozzle according to the invention also provides certain benefits and improvements, including: significantly reduced cost and fabrication time and complexity due to the use of standard size materials (e.g., standard pipe sizes available from piping suppliers such as schedule 80 pipe that is generally available in standard diameters ranging from 1-8 inches, preferably 1.5 to 5 inches) and reduced fabrication complexity and time due to the use of a simpler design for the gas and liquid inlet zones that does not require multiple interior zones of differing diameters. For example, as compared with a nozzle described in WO 2012/011989 A1 and WO 2012/011990 A1, the present nozzle does not include an intermediate zone between the gas inlet and liquid inlet zones that is different from the gas and liquid inlets (e.g., according to element 602b of FIG. 9B in WO 2012/011989 A1 and WO 2012/011990 A1) or, more particularly, does not include an intermediate zone having a smaller diameter than the liquid inlet zone (e.g., according to element 602c of FIG. 9B in WO 2012/011989 A1 and WO 2012/011990 A1) and the gas inlet zone (e.g., according to element 602a of FIG. 9B in WO 2012/011989 A1 and WO 2012/011990 A1). In addition, as compared with a nozzle described in WO 2012/011989 A1 and WO 2012/011990 A1, the present nozzle is not required to have, and preferably does not have, a gas inlet zone having a diameter that is larger than the liquid inlet zone (e.g., according to elements 602a and 602b, respectively, in FIG. 9B of WO 2012/011989 A1 and WO 2012/011990 A1).

The foregoing description of one or more embodiments of the invention is primarily for illustrative purposes, it being recognized that many variations might be used that would still incorporate the essence of the invention. Reference should be made to the following claims in determining the scope of the invention.

All patents and publications cited in the foregoing description of the invention are incorporated herein by reference.

What is claimed is:

1. A nozzle for the distribution of a gas-liquid fluid mixture in a down-flow reactor comprising
a nozzle body having a top, a bottom, a length, a width or a diameter, and a wall having an interior and exterior surface, the nozzle body consisting of a gas inlet zone body portion, a liquid inlet zone body portion, and an exit zone body portion, wherein
the gas inlet zone body portion defines a gas inlet zone volume and has at least two offset gas inlets, located at differing lengths along the length of the nozzle body from the top of the nozzle body, for the passage of gas therethrough into the gas inlet zone volume and
the liquid inlet zone body portion defines a liquid inlet zone volume and has at least one liquid inlet for the passage of liquid therethrough into the liquid inlet zone volume, the gas and liquid inlet zone volumes being in fluid communication;
a nozzle cap located at the top of the nozzle body enclosing the top of the gas inlet zone body portion; and
a converging-diverging nozzle restrictor located in the exit zone at the bottom of the nozzle body, the nozzle restrictor having a frustoconical converging zone and a frustoconical diverging zone in fluid communication with the liquid inlet zone;
wherein, the nozzle does not include an intermediate zone between the gas inlet and liquid inlet zones having a smaller diameter than the liquid inlet zone and the gas inlet zone.

2. The nozzle of claim 1, wherein the gas inlet and liquid inlet zones are in fluid communication and are arranged such that during operation gas flows into the gas inlet zone and therefrom into the liquid inlet zone, and liquid flows into the liquid inlet zone, wherein the gas and liquid mix and flow into the exit zone.

3. The nozzle of claim 1, wherein one or more of the nozzle body, the gas inlet zone body portion, the liquid inlet zone body portion, and the exit zone body portion is substantially cylindrical.

4. The nozzle of claim 1, wherein one or more gas inlets are configured to produce a tangential flow of inlet gas around the interior of the gas inlet zone and to thereby provide a gas phase spiral flow.

5. The nozzle of claim 1, wherein the gas inlets are laterally spaced around the gas inlet zone body portion at about equal angles relative to the centerline of the nozzle body.

6. The nozzle of claim 1, wherein the gas inlet body portion has two gas inlets spaced at about 180 degrees apart, or three gas inlets spaced at about 120 degrees apart, or four gas inlets spaced at about 90 degrees apart.

7. The nozzle of claim 1, wherein the gas inlet body portion has two gas inlets.

8. The nozzle of claim 1, wherein one or more liquid inlets are configured to produce a tangential flow of liquid around the interior of the liquid inlet zone and to thereby provide a liquid phase spiral flow.

9. The nozzle of claim 1, wherein one or more of the liquid inlets is configured to provide the spiral flow of liquid in the liquid inlet zone volume, wherein the flow of liquid is from the liquid inlets to the exit zone body portion.

10. The nozzle of claim 1, wherein the liquid inlets are laterally spaced around the liquid inlet zone body portion at about equal angles relative to the centerline of the nozzle body.

11. The nozzle of claim 1, wherein the liquid inlet body portion has two liquid inlets spaced at about 180 degrees apart, or three liquid inlets spaced at about 120 degrees apart, or four liquid inlets spaced at about 90 degrees apart.

12. The nozzle of claim 1, wherein the liquid inlet body portion has two liquid inlets.

13. The nozzle of claim 1, wherein the gas phase spiral flow and the liquid phase spiral flow are in the same rotational direction.

14. A hydroprocessing system comprising the nozzle of claim 1.

15. A method for making a nozzle for the distribution of a gas-liquid fluid mixture in a down-flow reactor comprising
providing a standard size pipe having a defined length and width or diameter to form a nozzle body having a top, a bottom, a length, a width or a diameter, and a wall having an interior and exterior surface, the nozzle body consisting of a gas inlet zone body portion, a liquid inlet zone body portion, and an exit zone body portion;
forming a gas inlet zone body portion in the nozzle body comprising forming at least two offset gas inlets through the wall of the gas inlet zone body portion, the two offset gas inlets being located at differing lengths along the length of the nozzle body from the top of the nozzle body;
forming a liquid inlet zone body portion in the nozzle body comprising forming at least one liquid inlet through the wall of the liquid inlet zone body portion;
forming an exit zone body portion in the nozzle comprising adapting or configuring the bottom of the nozzle body to include a nozzle restrictor;
forming a nozzle cap configured to enclose the top of the gas inlet zone body portion as an integral part of the top of the nozzle body or from a separate material;
forming a nozzle restrictor comprising a frustoconical converging zone and a frustoconical diverging zone as an integral part of the bottom of the nozzle body or from a separate material;
affixing the nozzle cap to the top of the nozzle body to enclose the top of the gas inlet zone body portion when formed from the separate material; and
inserting or attaching the nozzle restrictor when formed from the separate material; wherein, the nozzle does not include an intermediate zone between the gas inlet and liquid inlet zones having a smaller diameter than the liquid inlet zone and the gas inlet zone.

16. The method of claim 15, wherein the gas inlet and liquid inlet zones are in fluid communication and are arranged such that during operation gas flows into the gas inlet zone and therefrom into the liquid inlet zone, and liquid flows into the liquid inlet zone, wherein the gas and liquid mix and flow into the exit zone.

17. The method of claim 15, wherein any of the nozzle body, the gas inlet zone body portion, the liquid inlet zone body portion, and the exit zone body portion is substantially cylindrical.

18. The method of claim 15, wherein one or more gas inlets are configured to produce a tangential flow of inlet gas around the interior of the gas inlet zone and to thereby provide a gas phase spiral flow.

19. The method of claim 15, wherein the gas inlets are laterally spaced around the gas inlet zone body portion at about equal angles relative to the centerline of the nozzle body.

20. The method of claim 15, wherein the gas inlet body portion has two gas inlets spaced at about 180 degrees apart, or three gas inlets spaced at about 120 degrees apart, or four gas inlets spaced at about 90 degrees apart.

21. The method of claim 15, wherein the gas inlet body portion has two gas inlets.

22. The method of claim 15, wherein one or more liquid inlets are configured to produce a tangential flow of liquid around the interior of the liquid inlet zone and to thereby provide a liquid phase spiral flow.

23. The method of claim 15, wherein one or more of the liquid inlets is configured to provide a spiral flow of liquid in the liquid inlet zone volume, wherein the flow of liquid is from the liquid inlets to the exit zone body portion.

24. The method of claim 15, wherein the liquid inlets are laterally spaced around the liquid inlet zone body portion at about equal angles relative to the centerline of the nozzle body.

25. The method of claim 15, wherein the liquid inlet body portion has two liquid inlets spaced at about 180 degrees apart, or three liquid inlets spaced at about 120 degrees apart, or four liquid inlets spaced at about 90 degrees apart.

26. The method of claim 15, wherein the liquid inlet body portion has two liquid inlets.

27. The method of claim 15, wherein the gas phase spiral flow and the liquid phase spiral flow are in the same rotational direction.

\* \* \* \* \*